March 11, 1969
W. D. HADLEY
3,432,201
CHOKER HOOK LOCKING CHAIN
Filed Aug. 28, 1967
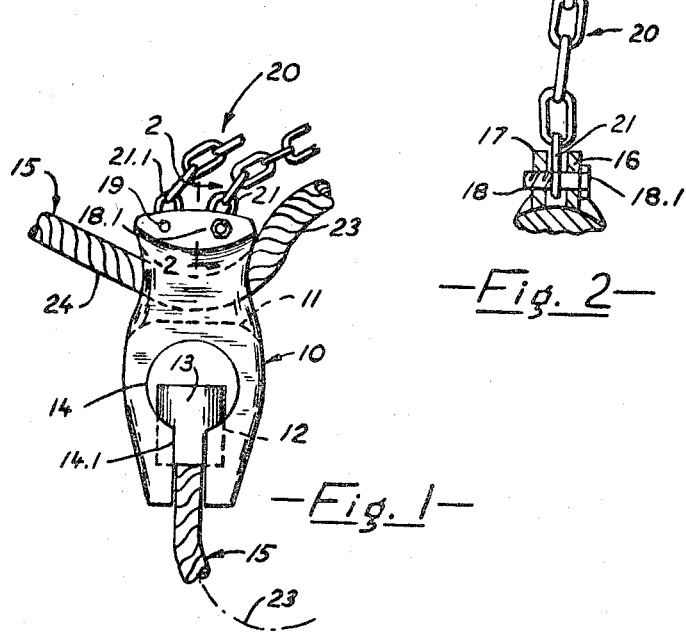
Fig. 1
Fig. 2
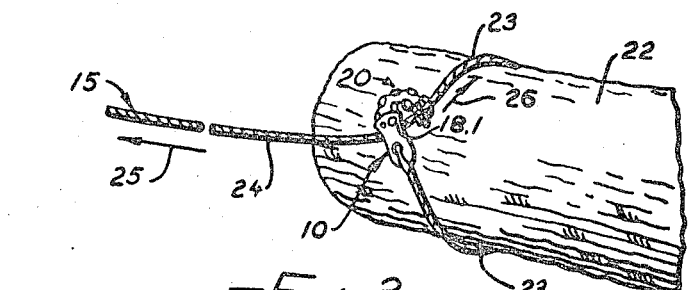
Fig. 3
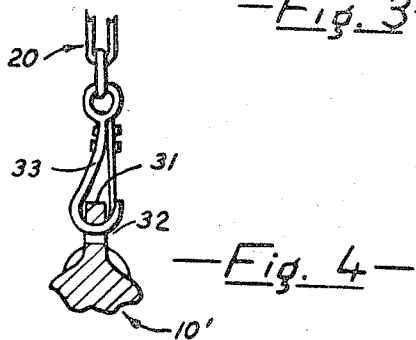
Fig. 4
William D. Hadley,
Inventor
By
Agent 3,432,201
CHOKER HOOK LOCKING CHAIN
William D. Hadley, Minstral Island,
British Columbia, Canada
Filed Aug. 28, 1967, Ser. No. 663,712
U.S. Cl. 294—74                                6 Claims
Int. Cl. B66c 1/12, 1/34

ABSTRACT OF THE DISCLOSURE

A locking chain for a choker hook. A short length of chain adapted for one end to be secured to the hook, the chain being wound a few turns about a running part of a loop of choker line looped around a load, with the other end of the chain then secured to the hook. The wrapped chain tends to prevent a noose formed when the line is tightened from loosening when the line slacks.

BACKGROUND OF THE INVENTION

The invention relates to a choker hook having a locking chain tending to restrict movement of a choker line relative to the hook in a direction tending to release a load.

A choker hook was patented by Bardon of Seattle, Wash., United States Patent 1,651,081 having issued to him in 1927. This hook is itself an improvement of a choker hook patented by Opsal in 1906, U.S. Patent 917,738. An improved Bardon hook invented by Thomas I'Anson, Jr., of Vancouver, British Columbia, is the subject of Canadian Patent 517,059 which was issued in 1955.

Choker hooks of this general type are extensively used in the Pacific Northwest Forest Region but, particularly in logging steep ground, difficulties have been found. A choker hook invented by Schopf of Portland, Oreg. issued in 1960 as Canadian Patent 602,290.

This inventor states in part: "A serious problem that has confronted the use of choker hooks over many years has been to find a safe method of controlling the sliding of the choker hook when tension is relieved on the power end of the choker. In the types of choker hooks employed, the hooks are free to slide when the tension is relieved and the cable becomes slack. In the case where the log is moving down hill and the loop formed by the usual choker hook and cable opens, the log or chokered load may become free of the choker and often extensive damage and personal injury results from the uncontrolled load."

Schopf's invention is directed to provide a solution to this problem by ingenious structure which permits sliding when the cable is bent, but inhibits sliding when the cable tends to strengthen as it would were the line to slacken.

OUTLINE OF THE INVENTION

My invention is directed to the problem for which Schopf has provided one solution.

I have found that I can prevent material loosening of the loop, or noose, by providing a short length of chain, suitably about two feet, ends of which are securable to a choker hook at an end thereof adjacent a slip sleeve through which the choker line slides as the loop is tightened. An end of the chain is secured to the choker hook, with the free end wrapped three or four times around the choker line on the loop or noose forming portion thereof, after which the free end is secured to the choker hook. I have found that, with this simple chain means, the noose tightens normally when tension is supplied to the choker line, but that in the event of slack developing in the line the noose will not loosen materially, since the chain restricts passage of the line through the choker hook in a direction to cause loosening.

Web and bolt means of the hook are provided to secure the chain thereto. In a preferred embodiment links at each end of the chain are secured by separate bolts each passing through spaced webs and a link between the webs. The bolts pass through the webs and links in opposite directions, so that one bolt head is disposed against an outer surface of each web. In this way, one bolt head is readily accessible however the hook is disposed. Alternative means of securing ends of the chain to the hook are also disclosed.

DESCRIPTION OF THE DRAWINGS

FIGURE 1 is a plan view of a locking chain choker hook according to the invention, as shown assembled to a choker line.

FIGURE 2 is a detail section on 2—2 of FIGURE 1.

FIGURE 3 is a small scale perspective showing the invention in use.

FIGURE 4 shows alternative fastening means.

The detail description following, illustrated by the drawings, is given by way of example—it being understood that the present invention is capable of expression in structure other than that particularly described and illustrated.

PREFERRED EMBODIMENT

Description related to FIGURES 1 and 2

A choker hook indicated generally by the numeral 10 has a slip sleeve opening 11, and a socket 12, the socket having an axis central of the hook and at right angles to the slip sleeve 11 as shown. A ferrule 13 is seated in the socket, the socket having a transverse opening 14 including a longitudinal slot 14.1 in one sidewall of the hook.

A choker line is indicated by the number 15, the ferrule being secured to an end of the line and seated in the socket 12 as shown, the choker line also passes slidably through the slip sleeve 11. The foregoing description is applicable to known hooks, for instance to a Bardon hook. In FIGURE 1, a Bardon hook is shown, which hook is modified as now to be described.

At an end of the hook adjacent the slip sleeve 11, spaced webs 16 and 17 are formed. As best is seen in FIGURE 2, the web 17 is drilled and tapped to accept a bolt 18 having a head 18.1. The web 16 is drilled and tapped to accept a bolt 19 having a head which is not seen in the figures. In the position shown in FIGURE 1, the bolt head 18.1 is accessible, but the head of the bolt 19 is against an underside of the flange 17. If the choker hook is disposed upside down of the FIGURE 1 position, the head of the bolt 19 would be exposed, while the head 18.1 would be on the then under side.

A link chain is indicated generally by the number 20, the chain having end links 21 and 21.1. The end links are releasably securable between the flanges 16 and 17 by the bolt means 18 and 19.

Chain details

Using a one inch choker line, a stock chain 26 inches long is satisfactory, the links being of 5/16 O.D. stock having oval openings half an inch by one inch. With larger lines, a somewhat longer chain is required to give the requisite number of turns.

Operation, with particular reference to FIGURE 3

In FIGURE 3, the choker line 15 is shown passing through the slip sleeves of the choker, bent around the load 22, e.g. a log, to form a loop 23 the ferruled end of the choker line being secured in the hook in the FIGURE 1 position. If the choker line is now hauled in a direction indicated by an arrow 25, the loop 23 will tighten with the line 15 sliding through the slip sleeve of the choker hook. This is a usual way in which a choker hook is used, and can result in loosening of the loop in some circumstances, as has been explained.

With a choker hook according to the present invention, the load is secured in the same manner as described above, with both ends of the chain 20 secured by the bolt means 18 and 19. In FIGURE 3, the choker hook is disposed with the bolt head 18.1 accessible to an operator—if the choker hook were disposed oppositely, the head of the bolt 19 would be exposed.

Having removed the bolt 18.1, remove that end of the chain and wrap the chain three or four times around the looped line 23 adjacent to the choker hook in the load side thereof, as shown in FIGURE 3.

Now, when the line is hauled in the direction 25, the noose will tighten as before without interference from the chain 20. For the loop to loosen, it would be required that the noose portion of the choker line move in a direction indicated by an arrow 26, when the line commences so to move it will be found that, because of the wrapping of the chain therearound, it will loosen only slightly so that the load is retained in the loop.

*Description of FIGURE 4*

I find the bolt means above to be simple and satisfactory, and it is found that special precautions for instance lock washers, are not required to prevent the loosening of the bolts under load. Equivalent attachment means can however be provided in a number of ways, one equivalent possibility being illustrated in FIGURE 4 where a single flange 31, holes 32 disposed as are the holes for the two bolts 18, 19 FIGURES 1 and 2. Each end of the chain 20 has a spring closed hook 33 for engagement with side walls of the holes. A further alternative is to provide each bolt with, in lieu a thread, a spring locking means retractable to release a bolt.

I prefer to use the simple bolt attachment means described, with heads of the bolts engaging opposite webs, since I find this is convenient to use and it has proved to be trouble free in difficult logging operations. However, the particular attachment means is unimportant and since any adequately strong readily securable means will serve the purpose.

I claim:

1. A choker hook having; a slip sleeve through which a choker line passes slidably, and means for securing an end of the choker line to the hook, constructed and arranged for the line to be looped around a load so that when an end of the line remote from the hook is hauled, the loop tightens around the load forming a noose; in combination with the foregoing
   (a) a short length of chain,
   (b) means releasably to secure one end of the chain to the hook at an end thereof adjacent the slip sleeve, adapted so that said one end of the chain being secured to the hook as aforesaid, the chain can be wrapped around a part of the looped line adjacent the hook, and the remaining end secured to the hook, so as to restrain sliding of the line through the slip sleeve in a direction to loosen the noose.

2. Structure as defined in claim 1, the chain securing means including a flange, and a bolt passing through the flange and through a link of a chain.

3. Structure as defined in claim 1, the chain securing means including two spaced flanges formed at an end of the hook adjacent the slip sleeve, and bolt means passing through the flanges with links of the chain being secured by the bolt means.

4. Structure as defined in claim 1, having two spaced flanges formed at an end of the hook adjacent the slip sleeve, each flange having two holes for passage of bolts therethrough, only one hole of each flange being tapped to receive threaded ends of the bolts with a head of each bolt disposed against the flange, a link of the chain being releasably securable between the flanges by each bolt.

5. Structure as defined in claim 2, having two spaced flanges formed at an end of the hook adjacent the slip sleeves, each flange having two holes for passage of bolts therethrough, only one hole of each flange being tapped to receive threaded ends of the bolts with a head of each bolt disposed against the flange, a link of the chain being releasably secured between the flanges by each bolt.

6. Structure as defined in claim 1, chain releasable securing means wherein; each end of the chain has a spring closed hook, a flange secured to an end of the hook adjacent the slip sleeve, and a hole of the flange for releasable engagement of the hook with the flange.

References Cited

UNITED STATES PATENTS

| | | | |
|---|---|---|---|
| 1,651,081 | 11/1927 | Bardon | 294—74 |
| 2,014,201 | 9/1935 | Field | 294—74 |
| 3,362,744 | 1/1968 | Ek | 294—74 |

ANDRES H. NIELSEN, *Primary Examiner.*

U.S. Cl. X.R.

294—78